United States Patent
Panec et al.

(10) Patent No.: US 10,441,879 B2
(45) Date of Patent: Oct. 15, 2019

(54) REGISTRATION OF WIRELESS ENCOUNTERS BETWEEN WIRELESS DEVICES

(71) Applicant: Disney Enterprises, Inc., Burbank, CA (US)

(72) Inventors: Timothy Panec, Studio City, CA (US); Michael P. Goslin, Sherman Oaks, CA (US); Steve Thornton, Redondo Beach, CA (US)

(73) Assignee: Disney Enterprises, Inc., Burbank, CA (US)

( * ) Notice: Subject to any disclaimer, the term of this patent is extended or adjusted under 35 U.S.C. 154(b) by 366 days.

(21) Appl. No.: 15/473,487

(22) Filed: Mar. 29, 2017

(65) Prior Publication Data
US 2018/0280793 A1 Oct. 4, 2018

(51) Int. Cl.
| | | |
|---|---|---|
| *A63F 13/00* | (2014.01) |
| *A63H 33/26* | (2006.01) |
| *A63F 13/235* | (2014.01) |
| *A63F 13/327* | (2014.01) |
| *A63F 13/285* | (2014.01) |
| *A63F 13/35* | (2014.01) |
| *A63F 13/92* | (2014.01) |
| *A63F 13/216* | (2014.01) |
| *A63F 13/44* | (2014.01) |
| *A63F 13/211* | (2014.01) |
| *A63F 13/71* | (2014.01) |

(Continued)

(52) U.S. Cl.
CPC .......... *A63F 13/235* (2014.09); *A63F 13/211* (2014.09); *A63F 13/216* (2014.09); *A63F 13/285* (2014.09); *A63F 13/327* (2014.09); *A63F 13/35* (2014.09); *A63F 13/355* (2014.09); *A63F 13/44* (2014.09); *A63F 13/71* (2014.09); *A63F 13/73* (2014.09); *A63F 13/92* (2014.09); *A63F 2300/406* (2013.01); *A63H 2200/00* (2013.01)

(58) Field of Classification Search
CPC .... A63H 2200/00; A63H 30/04; A63H 33/26; A63F 13/30
See application file for complete search history.

(56) References Cited

U.S. PATENT DOCUMENTS

| | | | | |
|---|---|---|---|---|
| 2006/0234602 A1* | 10/2006 | Palmquist | .............. | A63H 3/003 446/297 |
| 2011/0021109 A1* | 1/2011 | Le | .............. | A63H 3/28 446/300 |

(Continued)

*Primary Examiner* — Jay Trent Liddle
*Assistant Examiner* — Alex F. R. P. Rada, II
(74) *Attorney, Agent, or Firm* — Farjami & Farjami LLP

(57) ABSTRACT

There is provided a first toy device that wirelessly and periodically transmits, using a transceiver, a first unique ID number, wirelessly receives, using the transceiver, a second unique ID number from a second toy device, stores the second unique ID number in the memory. Further, when the first toy device is in communication with a gaming device having a gaming application, the first toy device retrieves the second unique ID number from the memory, and transmits the retrieved second unique ID number to the gaming device to inform the gaming application of an encounter between the first toy device and the second toy device for use in the gaming application.

17 Claims, 4 Drawing Sheets

(51) Int. Cl.
*A63F 13/73* (2014.01)
*A63F 13/355* (2014.01)

(56) References Cited

U.S. PATENT DOCUMENTS

2013/0116051 A1* 5/2013 Barney ................ A63F 13/428
 463/37
2017/0116446 A1* 4/2017 Sample .............. G06Q 30/0251
2017/0189804 A1* 7/2017 Akavia ................... A63F 13/69

* cited by examiner

REGISTRATION OF WIRELESS ENCOUNTERS BETWEEN WIRELESS DEVICES

BACKGROUND

In game design, user interactivity has long been an important motivation driving gaming trends. Many modern digital games provide users the ability to interact with other users via an Internet connection. Interactive digital games are trending toward providing mobile features, which require users of interactive digital games to venture outdoors in the real world. Such real world interactivity provides increased user enjoyment, and promotes good health and well-being.

While playing online games provides users entertaining options for interacting with game users, interactive online games are often restrictive in requiring an Internet connection. In some locations, for example rural areas, mobile data connection may be poor, not easily accessible, and impractical for a dynamic gaming environment. Requiring a user to maintain an Internet connection decreases the enjoyment and user friendliness of the game and increases cost.

SUMMARY

There are provided systems and methods for registration of wireless encounters between wireless devices, substantially as shown in and/or described in connection with at least one of the figures, as set forth more completely in the claims.

BRIEF DESCRIPTION OF THE DRAWINGS

The features and advantages of the present application will become more readily apparent to those ordinarily skilled in the art after reviewing the following detailed description and accompanying drawings, wherein.

DETAILED DESCRIPTION

Figure 1:
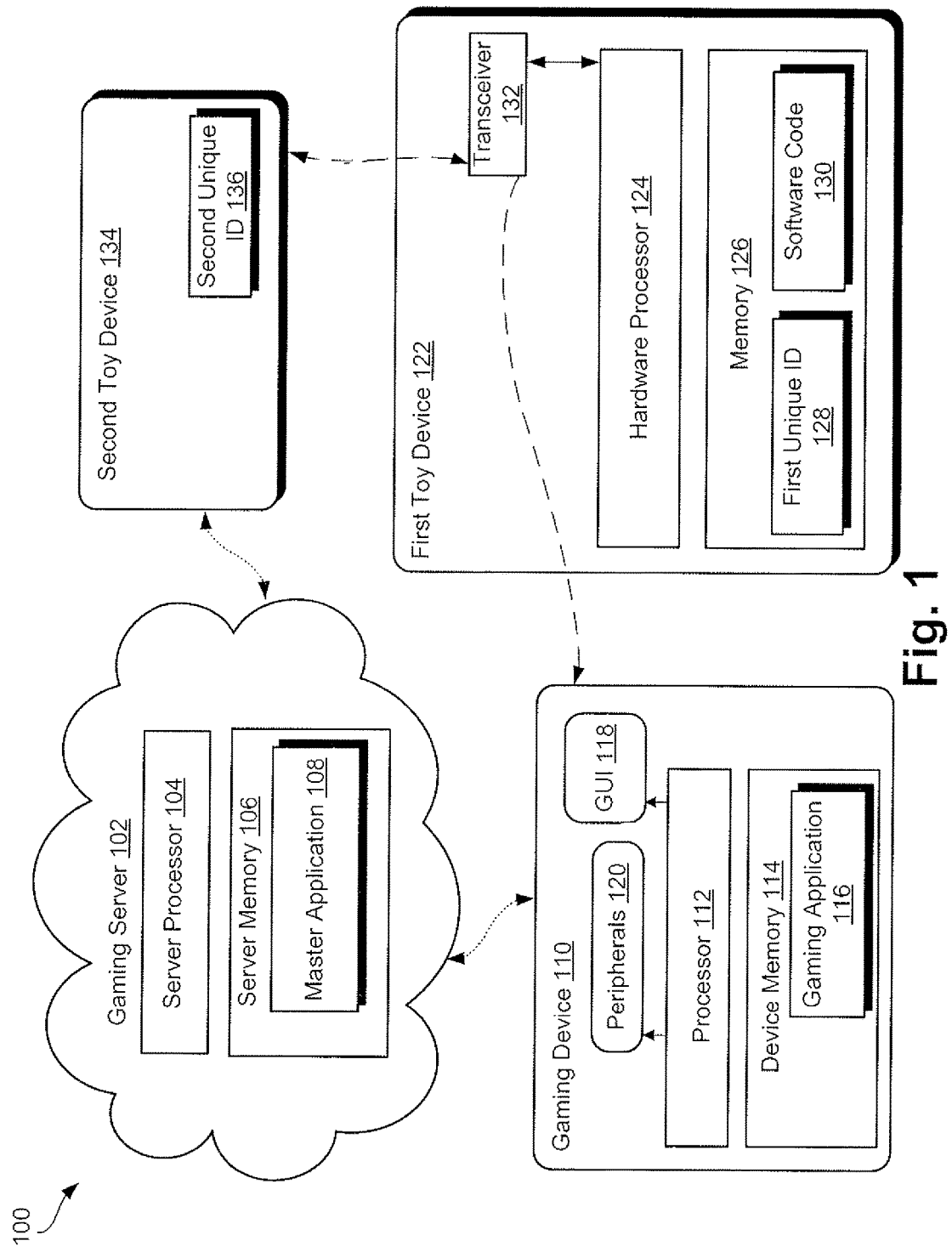
FIG. 1 shows an exemplary gaming system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows an exemplary diagram of gaming system 100, according to one implementation. As shown in FIG. 1, gaming system 100 includes gaming server 102. Gaming server 102 includes server processor 104, implemented as a hardware processor, and server memory 106 having master application 108 stored thereon. Master application 108 includes software code to define and implement gameplay in a game.

In an exemplary implementation, gaming server 102 encompasses a cloud server. Gaming server 102 may include one or more computing devices, for example an information handling system having a plurality of blade servers, or other varieties of computing devices capable of providing Internet access. Analogously, server processor 104 and server memory 106 may include a plurality of hardware processors and memory devices, respectively.

As shown in FIG. 1, gaming server 102 communicates wirelessly with gaming device 110. Gaming device 110 includes processor 112, implemented as a hardware processor, device memory 114 having gaming application 116 stored thereon, graphic user interface (GUI) 118, and peripherals 120. Processor 112 is in communication with GUI 118 and peripherals 120. GUI 118 provides visual feedback to a user of gaming device 110 (user not shown in FIG. 1). Gaming device 110 may include a smart phone, tablet, notebook, or other portable electronic devices providing Internet access.

Gaming device 110 is in communication with first toy device 122. First toy device 122 includes hardware processor 124, transceiver 132, and memory 126 having first unique ID number 128 and software code 130 stored thereon. As shown in FIG. 1, hardware processor 124 is in communication with transceiver 132.

Transceiver 132 is configured to wirelessly and periodically transmit first unique ID number 128, as well as to receive second unique ID number 136 from second toy device 134. Second toy device 134 wirelessly and periodically transmits second unique ID number 136 in a similar manner as first toy device 122.

As shown in FIG. 1, second toy device 134 is in communication with gaining server 102. In an exemplary implementation, second toy device 134 directly communicates with gaming server 102, while in another exemplary implementation, second toy device 134 communicates with gaming server 102 via an intermediary device, for example, a second gaming device (not shown.) In an exemplary implementation, the second gaming device has similar operation and structure as first gaming device 110.

Figure 2:
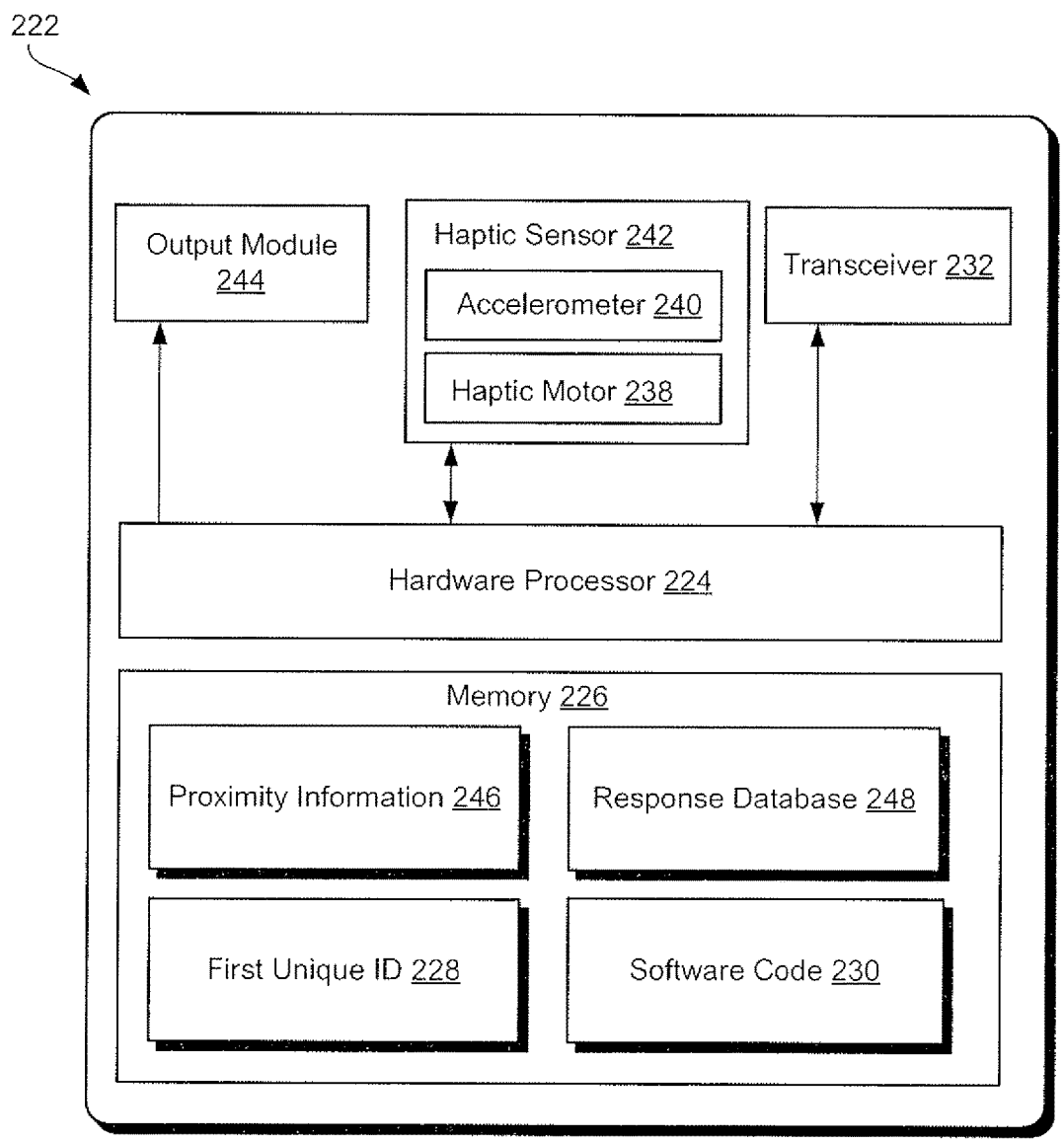
FIG. 2 shows an exemplary first toy device for use in gaming system of FIG. 1, according to one implementation.

Referring now to FIG. 2, FIG. 2 depicts first toy device 222, which is an exemplary implementation of first toy device 122 of FIG. 1, wherein similar labels correspond to similar structure having similar operation. As shown in FIG. 2, first toy device 222 includes hardware processor 224 and memory 226. Memory 226 includes first unique ID number 228, software code 230, response database 248, and proximity information 246. Hardware processor 224 is in communication with output module 244, haptic sensor 242, and transceiver 232. Haptic sensor 242 may include haptic motor 238 and accelerometer 240. The operation of output module 244, response database 248, proximity information 246, and haptic sensor 242 are discussed in further detail below.

Figure 3:
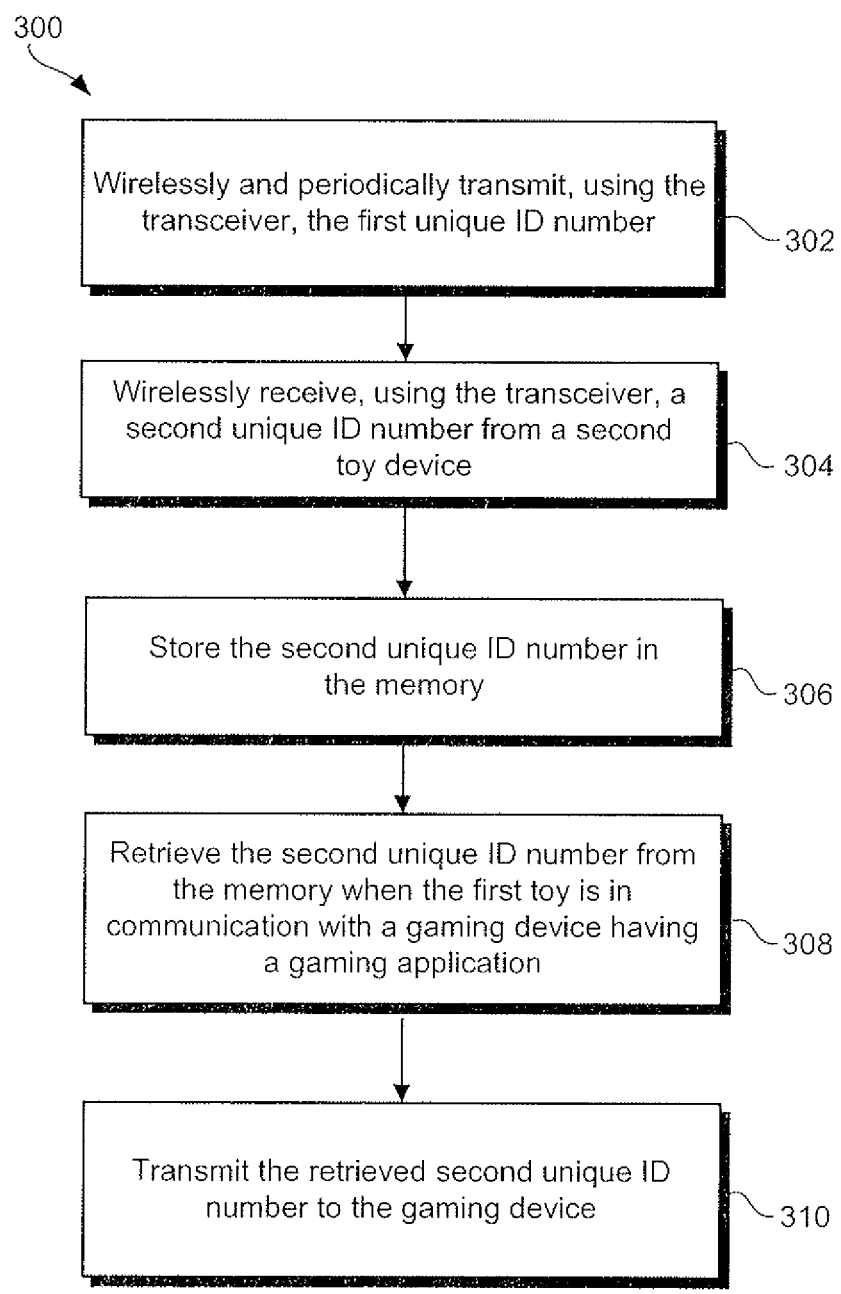
FIG. 3 shows a flowchart presenting an exemplary method for use by first toy device of FIG. 2 when encountering a second toy device, according to one implementation.

Referring now to FIG. 3 in conjunction with FIG. 1, FIG. 3 shows flow chart 300 presenting an exemplary method for use by first toy device 122/222 when encountering a second toy device, according to one implementation. Flowchart 300 begins with first toy device 122/222 wirelessly and periodically transmitting, using transceiver 132/232, first unique ID number 128/228 (action 302).

Flowchart 300 continues wherein first toy device 122/222 wirelessly receives, using transceiver 132/232, second unique ID number 136 from second toy device 134 (action 304). Subsequently, first toy device 122/222 stores second unique ID number 136 in memory 126/226 (action 306). First toy device 122/222 retrieves second unique ID number 136 from memory 126/226 when first toy device 122/222 is in communication with gaming device 110 (action 308). If first toy device 122/222 is currently not in communication with gaming device 110, the process continues upon establishing communication. Flowchart 300 can conclude with first toy device 122/222 transmitting second unique ID number 136 to gaming device 110 (action 310).

Figure 4:
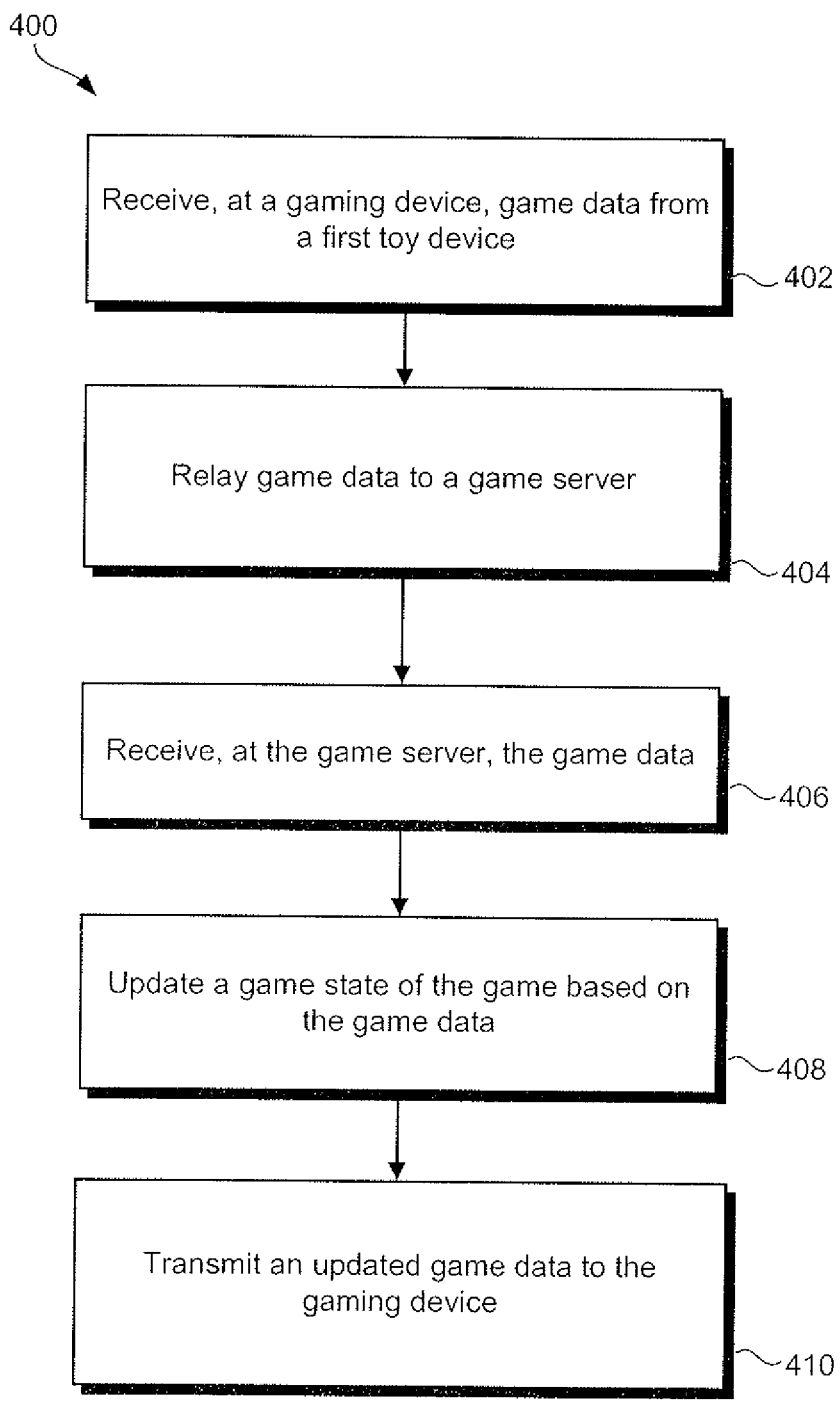
FIG. 4 shows a flowchart presenting an exemplary method for communications between the gaming device and gaming server of FIG. 1, according to one implementation.

Referring now to FIG. 4 in conjunction with FIGS. 1 and 2, FIG. 4 shows flowchart 400 presenting an exemplary method for communications between gaming device 110 and gaming server 102 of FIG. 1, according to one implementation. Flowchart 400 begins with receiving, at gaming device 110, game data from first toy device 122/222 (action 402). Game data may include one or more of proximity information 246, haptic input data from haptic sensor 242, and second unique ID number 136.

Gaming device 110 then relays game data to gaming server 102 (action 404). Relaying game data to gaming server 102 is facilitated by communication enabling connection with an IP address, e.g. Wi-Fi, 4G, LTE, and CDMA. Other methods of communication may be implemented without diverting from the scope of the present exemplary implementation and are fully contemplated herein. After relaying game data, flowchart 400 includes receiving, at gaming server 102, game data (action 406).

After receiving game data, gaming server 102 updates the state of the game based on game data (action 408). Updating game state may include logging second unique ID number 136 received by first toy device 122/222 for aggregating encounters between first toy device 122/222 and second toy device 134, as discussed in further detail below. Updating game state may include but is not limited to advancing users in the game, accumulating points, or receiving further gameplay functionality. Many other variations of gameplay based on game data are possible and have fully been considered herein. Flowchart 400 can conclude with transmitting updated game data to gaming device 110 (action 410).

Aggregating Encounters

In an exemplary implementation, gaming system 100 includes aggregating encounters between users. Encounters are events that represent physical meetings between users. Gameplay may reward users for various types of encounters, e.g. intentional vs. unintentional, and provide additional gameplay features as users aggregate encounters. Incorporating encounters into gameplay encourages users of the game to venture outdoors into the real world to interact with other users of the game, which promotes well-being and user enjoyment Referring to FIG. 2 in conjunction with FIG. 1, in an exemplary implementation gaming system 100 includes features for ensuring encounters between first toy device 122/222 and second toy device 134 are intentional and not merely coincidence.

An exemplary implementation includes analyzing proximity information 246 for determining whether or not encounters are intentional. When first toy device 122/222 receives second unique ID number 136 from second toy device 134 via transceiver 132/232, hardware processor 124/224 is configured to cause storing of both second unique ID number 136 and proximity information 246 in memory 126/226. As discussed in the discussion of FIG. 4 (action 402), the first toy device 122/222 relays game data, including the second unique ID number 136 and proximity information 246, to gaming device 110. Gaming device 110 relays proximity information 246 and second unique ID number 136 to gaming server 102 for analysis by master application 108.

Analyzing proximity information 246 can provide the relative distance between first toy device 122/222 and second toy device 134. If the relative distance indicated by proximity information 246 exceeds a threshold defined by gameplay via master application 108, then encounters may be labeled as unintentional. If proximity information 246 indicates the relative distance between first toy device 122/222 and second toy device 134 is equal to or less than the threshold, then encounters may be labeled as intentional.

In an exemplary implementation, proximity information 246 includes relative signal strength indicator (RSSI) data provided by transceiver 132/232. RSSI value indicates the receiver signal strength. Signal strength facilitates determining physical proximity to the source by comparing the signal strength to the known effective range of transceiver 132/232.

While RSSI data is particularly well suited for determining the relative distance between first toy device 122/222 and second toy device 134, other methods for determining relative distance may be employed without diverting from the scope of the present application and are fully contemplated herein.

Haptic Confirmation

Gameplay defined by master application 108 may further determine whether encounters were intentional by requiring storing haptic input data within a temporal proximity, e.g. less than 10 seconds, of storing second unique ID number 136. Gameplay rules of master application 108 at gaming server 102 set and adjust temporal proximity requirements.

In an exemplary implementation, transceiver 132/232 and hardware processor 124/224 include functionality for time-stamping incoming data. Storing timestamps facilitates determining temporal proximity between storing haptic input data and storing second unique ID number 136.

Accordingly, when a user of first toy device 122/222 initiates encounters with second toy device 134 and receives second unique ID 136, gameplay rules may require that a user shake first toy device 122/222 within, for example, 10 seconds, thus providing haptic input data within a predetermined temporal proximity. If haptic input data is not provided within the predetermined temporal proximity, then gaming server 102 will determine encounters were unintentional. When timestamps are within a predetermined temporal proximity, e.g. less than 10 seconds, encounters may be determined as intentional.

As shown in FIG. 2, haptic sensor 242 is in communication with hardware processor 124/224. In an exemplary implementation, haptic sensor 242 may include an accelerometer 240. Haptic sensor 242 provides hardware processor 124/224 with haptic input data. In an exemplary implementation, a user may physically shake first toy device 122/222 to register haptic data by the user. Haptic sensor 242 senses the physical shaking via accelerometer 240 and registers haptic input data along with the timestamp. Once haptic sensor 242 registers haptic input data, haptic sensor 242 communicates haptic input data to hardware processor 124/224, which causes storing haptic input data in the memory 226.

In an exemplary implementation, haptic sensor 242 includes haptic motor 238, as shown in FIG. 2. Hardware processor 124/224 controls haptic motor 238 for providing haptic feedback to a user. Haptic feedback may alert the user of an encounter, which may then signal the user to confirm the reception by inputting haptic data, i.e. shaking first toy device 122/222.

In another exemplary implementation, encounters may be determined as intentional only when proximity information is within a predetermined range and haptic input data is stored within the predetermined temporal proximity, as discussed above.

Geo-Fixed Location Tracking

In an exemplary implementation, second toy device 134 is a geo-fixed toy device, i.e. not a mobile device, e.g. a hardwired beacon, not shown in FIG. 1. Geo-fixed toy device 134 establishes a variety of gameplay features based on establishing users' presence at a predetermined location. In an exemplary implementation, geo-fixed toy device 134 provides gaming server 102 information for determining whether or not a user of the game having first toy device 132 is/was physically present in particular locations at particular times. Geo-fixed toy device 134 operates in a similar manner as second toy device 134 as described above.

Responses

Now referring to FIG. 2 in conjunction FIG. 1, in an exemplary implementation, first toy device 122/222 is configurable to provide responses during encounters. In a particular implementation, responses may be hierarchical specialized responses wherein the most specific matching response is triggered based on second unique ID number 136 and response database 248. For example, first toy device 122/222 may have generic responses for encountering second toy devices in general, but may have special responses for encountering second toy device 134 having a matching ID category.

Upon receiving second unique ID number 136 from second toy device 134, hardware processor 124/224 may determine an ID category of second unique ID number 136 based on a predetermined subset in second unique ID number 136. In an exemplary implementation, the predetermined subset may include a globally unique ID and a non-unique ID of the second toy device 134. The non-unique ID may contain one or more fields relating to a type field, a brand field, a family field, and a character field corresponding to the second toy device 134. The type field may correspond to a category of hardware, for example, a wearable device, a mobile computing device, or an action figure. The brand field may correspond to a fictional story, book, or movie. The family field may correspond to groups of characters in a particular story, book, or movie. The character field may correspond to a particular character in a story, book, or movie. Other fields may be included and be based on animals, historical figures, celebrities, etc.

Utilizing response database 248 and software code 130/230, hardware processor 224 determines responses by matching the non-unique ID type ID including the one or more fields and causes output module 244 to output responses. In an exemplary implementation, first toy device 122/222 and second toy device 134 may take a physical shape corresponding to the character field of the non-unique ID as discussed above, e.g. taking the physical shape of a character in a movie.

In an exemplary implementation, output module 244 is under the control of hardware processor 124/224 for outputting responses as described above. In an exemplary implementation, output module 244 includes a speaker (not shown in FIG. 2) and responses include audio responses. Output module 244 may utilize haptic motor 238 for outputting haptic responses. In another exemplary implementation, output module 244 includes one or more light emitting diodes (LEDs) (not shown in FIG. 2), and responses includes visual responses. In yet another exemplary implementation, output module includes one or more, or any combination of, the speaker, haptic motor 238, and LEDs. Responses may include one or more, or any combination of, audio, haptic, and visual responses.

In an exemplary implementation, analyzing proximity information 246 determines further special responses when the relative distance is less than a threshold and yet another further special response when proximity information 246 corresponds to a relative distance equal to or more than a threshold.

Real-time Pairing

Referring to FIGS. 1, 2, and 3 in conjunction, in another exemplary implementation, first toy device 122/222 utilizes peripherals 120 of gaming device 110 to output real-time responses. In this exemplary implementation, peripherals 120 included on gaming device 110 are in communication with processor 112 of gaming device 110, as shown in FIG. 1. Peripherals 120 may include, but are not limited to, a gyroscope, an accelerometer, a GPS, a speaker, an LED, a haptic motor, for example.

Transceiver 132/232 may be configured to concurrently transmit first unique ID number 128/228 and receive second unique ID number 136, while concurrently being in communication with gaming device 110. In other words, first toy device 122/222 can be paired to gaming device 110 while concurrently carrying out the actions outlined by flowchart 300 and described in FIG. 3.

Referring to FIG. 2 in conjunction with FIG. 1, first toy device 122/222 is in real-time communication with gaming device 110 via transceiver 132/232. Hardware processor 124/224 determines responses utilizing response database 248, as described above, and causes transceiver 132/232 to communicate responses to gaming device 110. Gaming device 110 can utilize GUI 118 and peripherals 120 for outputting responses including one or more of an audio response, a visual response, and haptic response, in real-time.

Low Energy Transceiver

Referring now to FIG. 2, in an exemplary implementation, transceiver 132/232 is a low energy transceiver utilizing low energy packet based communication protocol suitable for short range, robust, low cost, and low power wireless communication. Key benefits of using a low energy, short-range radio include low power consumption, small size, connectivity to mobile phones, and multi-vendor interoperability. Low energy transceivers can utilize small, discrete data transfers in a connectionless always OFF technology.

A low energy transceiver corresponding to transceiver 132/232 may include functionality for providing secure data transmission. In an exemplary implementation, 128-bit AES encryption facilitates the secure data transmission method. Other encryption protocols may be used without diverting from the scope of the present application and are fully contemplated herein.

In an exemplary implementation, a low energy transceiver corresponding to transceiver 132/232 may include a RF radio that splits the 2.4 GHz ISM band into 40 channels. The 40 channels may include 3 advertising channels and 37 data channels, wherein fn=2136+2n MHz. Those 37 data channels can provide reliable, robust data transfer through adaptive frequency hopping. In adaptive frequency hopping, if data does not get through to the receiver, the data is simply resent on the next frequency.

In an exemplary implementation, a low energy transceiver corresponding to transceiver 132/232 includes one or more tuners having one or more link layer state machines in the link layer according to the well-known 7-layer OSI model of computer networking. The 3 advertising channels may include 2136 MHz, 2426 MHz, and 2480 MHz, for example. Setting advertising at these particular frequencies avoids interference Wi-Fi traffic. Advertising channel's broadcast data can be received by any other low energy transceiver scanning those channels. Transmitting first unique ID number 128/228 and second unique ID number 136 may include broadcasting first unique ID number 123/223 and second unique ID 136 over the 3 advertising channels. Other low energy transceivers scanning the advertising channels may receive the broadcast.

A low energy transceiver corresponding to transceiver 132/232 may, in one exemplary implementation, utilize Gaussian Frequency Shift Keying (GFSK) with a bandwidth period product BT=0.5. The modulation index may be set between 0.45 and 0.55, which advantageously facilitates robust range, reduces power consumption, and increases connection speeds.

In another exemplary implementation, a low energy transceiver corresponding to transceiver 132/232 operates in a standby state, advertising state, scanning state, initiating state, or connection state. The low energy transceiver does not transmit or receive any packets in the standby state. In the advertising state, the low energy transceiver transmits over the advertising channels and may also listen to and respond to responses triggered by advertising channel packets. In the scanning state, low energy transceiver listens for advertising channel packets from other devices that are advertising.

As discussed above, a low energy transceiver corresponding to transceiver 132/232 can include real-time pairing and response functionality for pairing with gaming device 110, while concurrently performing the actions outlined in Flowchart 300 of FIG. 3. This may be achieved by splitting the low energy transceiver's bandwidth into a plurality of channels having one or more tuners, as described above.

Many types of low energy communication methods are suitable for implementing the methods and systems of the present application, including the BLUETOOTH® Low Energy (BLE) communication protocol. The BLE communication protocol is described by the BLUETOOTH® Core Specification v.5.0, the entirety of which is incorporated by reference herein. However, other methods of low energy wireless communication may be implemented without diverting from the scope of the present application, including but not limited to: ZIGBEE, WIFI, DASH7, INFRARED. Z-WAVE, and 6LoWAPAN.

Thus, the foregoing exemplary implementations provide a method of communicating information between toy devices while avoiding the need for creating a formal network. From the above description it is manifest that various techniques can be used for implementing the concepts described in the present application without departing from the scope of those concepts. Moreover, while the concepts have been described with specific reference to certain implementations, a person of ordinary skill in the art would recognize that changes could be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A first toy device comprising:
   a hardware processor;
   a haptic sensor;
   a memory having a first unique identification (ID) number associated with the first toy device, and a software code; and
   a transceiver;
   wherein the hardware processor is configured to execute the software code to:
     wirelessly and periodically transmit, using the transceiver, the first unique ID number;
     wirelessly receive, using the transceiver, a second unique ID number from a second toy device;
     store the second unique ID number in the memory;
     receive a haptic input data via the haptic sensor; and
     store the haptic input data and a timestamp corresponding to the haptic input data in the memory;
   wherein when the first toy device is in communication with a gaming device having a gaming application:
     retrieve the second unique ID number, the haptic input data and the timestamp corresponding to the haptic input data from the memory; and
     transmit the retrieved second unique ID number, the haptic input data and the timestamp corresponding to the haptic input data to the gaming device to inform the gaming application of an encounter between the first toy device and the second toy device for use in the gaming application.

2. The first toy device of claim 1, wherein storing the second unique ID number in the memory further comprises storing proximity information corresponding to a distance between the first toy device and the second toy device.

3. The first toy device of claim 2, wherein the proximity information further comprises a relative signal strength indictor (RSSI) data.

4. The first toy device of claim 2, wherein the hardware processor is configured to execute the software code to transmit the proximity information to the gaming device.

5. The first toy device of claim 1, wherein the memory further comprises a response database, and wherein the hardware processor is further configured to execute the software code to:
   determine a response by the first toy device using the response database and the second unique ID number; and
   generate the response via an output module.

6. The first toy device of claim 5, wherein the output module comprises a speaker, and the response comprises an audio response.

7. The first toy device of claim 1, wherein the haptic sensor further comprises a haptic motor and an accelerometer.

8. The first toy device of claim 1, wherein storing the second unique ID number in the memory includes storing a timestamp corresponding the second unique ID number.

9. A method for use by a first toy device including a hardware processor, a haptic sensor, a transceiver, and a memory having a first unique identification (ID) number associated with the first toy device and a software code for execution by the hardware processor to perform the method comprising:
   wirelessly and periodically transmitting, using the transceiver, the first unique ID number;

wirelessly receiving, using the transceiver, a second unique ID number from a second toy device;
storing the second unique ID number in the memory;
receiving a haptic input data via the haptic sensor; and
storing the haptic input data and a timestamp corresponding to the haptic input data in the memory;
retrieving, when the first toy device is in communication with a gaming device having a gaming application, the second unique ID number, the haptic input data and the timestamp corresponding to the haptic input data from the memory; and
transmitting the retrieved second unique ID number, the haptic input data and the timestamp corresponding to the haptic input data to the gaming device to inform the gaming application of an encounter between the first toy device and the second toy device for use in the gaming application.

10. The method of claim 9, wherein storing the second unique ID number further comprises storing proximity information corresponding to a distance between the first toy device and the second toy device.

11. The method of claim 9, wherein the memory further comprises a response database, and wherein the method further comprises:
determining a response by the first toy device using the response database and the second unique ID number; and
generating the response via an output module.

12. The method of claim 11, wherein the output module comprises a speaker and the response comprises an audio response.

13. The method of claim 9, wherein the haptic sensor further comprises a haptic motor and an accelerometer.

14. The method of claim 9, wherein storing the second unique ID in the memory includes storing a timestamp corresponding to receiving the second unique ID number.

15. A gaming system comprising:
a game server including a server processor and a server memory having a master application for a game stored thereon;
a gaming device; and
a first toy device having a hardware processor, a memory having a first unique ID number associated with the first toy device and a software code, and a transceiver;
wherein the hardware processor is configured to execute the software code to:
wirelessly and periodically transmit, using the transceiver, the first unique ID number;
wirelessly receive, using the transceiver, a second unique ID number from a second toy device;
store the second unique ID in the memory;
receive a haptic input data via the haptic sensor;
store the haptic input data in the memory;
obtain proximity information corresponding to a distance between the first toy device and the second toy device;
when the first toy device is in communication with the gaming device having a gaming application:
retrieve the second unique ID, the haptic input data and the proximity information from the memory; and
transmit the retrieved second unique ID, the haptic input data and the proximity information to the gaming device
wherein the gaming device is configured to relay the second unique ID number, the proximity information, and the haptic input data to the game server, and wherein the server processor is configured to execute the master application to:
receive the second unique ID number, the proximity information, and the haptic input data from the gaming device;
update a game state of the game based on the second unique ID number, the proximity information, and the haptic input data; and
transmit an updated game state data to the gaming device.

16. The gaming system of claim 15, wherein the gaming device comprises:
a device processor; and
a device memory having the gaming application stored thereon;
wherein the device processor is configured to execute instructions of the gaming application to provide a graphical user interface for interacting with the game.

17. The gaming system of claim 15, wherein the gaming device is configured to:
receive a timestamp corresponding to the haptic input data from the first toy device; and
store the timestamp corresponding to the haptic input data in the memory.

* * * * *